(12) United States Patent
Liu et al.

(10) Patent No.: US 8,561,975 B2
(45) Date of Patent: Oct. 22, 2013

(54) ROTARY JOINT AND WORKTABLE USING THE SAME

(75) Inventors: Zhen-Xing Liu, Shenzhen (CN); Da-Wei Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 360 days.

(21) Appl. No.: 12/981,536

(22) Filed: Dec. 30, 2010

(65) Prior Publication Data
US 2011/0266732 A1   Nov. 3, 2011

(30) Foreign Application Priority Data
Apr. 30, 2010 (CN) .......................... 2010 1 0160625

(51) Int. Cl.
*B23Q 1/25* (2006.01)
(52) U.S. Cl.
USPC .............................................. 269/55; 269/32

(58) Field of Classification Search
USPC .................... 269/55, 60, 24, 27, 32
See application file for complete search history.

(56) References Cited

U.S. PATENT DOCUMENTS

| | | | |
|---|---|---|---|
| 5,855,365 A * | 1/1999 | Hong | 269/32 |
| 7,581,722 B2 * | 9/2009 | Garry et al. | 269/296 |
| 7,934,710 B2 * | 5/2011 | Chiu | 269/24 |
| 2011/0266732 A1 * | 11/2011 | Liu et al. | 269/55 |

\* cited by examiner

*Primary Examiner* — Lee D Wilson
(74) *Attorney, Agent, or Firm* — Altis & Wispro Law Group, Inc.

(57) ABSTRACT

A rotary joint includes a shaft, at least one input member defining an input hole rotatably sleeved on the shaft, and a plurality of sealing members positioned between the shaft. the at least one input member and an output member are fixed on the shaft. The shaft, the at least one input member, and the sealing members defines a circular channel cooperatively communicating with the input hole. The output member defines at least one output hole corresponding to the input member. The shaft defines at least one transmission hole intercommunicating the at least one output hole and the circular channel.

12 Claims, 5 Drawing Sheets

ROTARY JOINT AND WORKTABLE USING THE SAME

BACKGROUND

1. Technical Field

The present disclosure relates generally to rotary joints, and especially to a rotary joint and a worktable using the same.

2. Description of Related Art

A commonly used worktable includes a workstation, a conduit providing liquid to the workstation and a joint for fixing the conduit to the workstation. However, if the workstation moves in a rotary fashion, the conduit is prone to twisting, and can malfunction.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
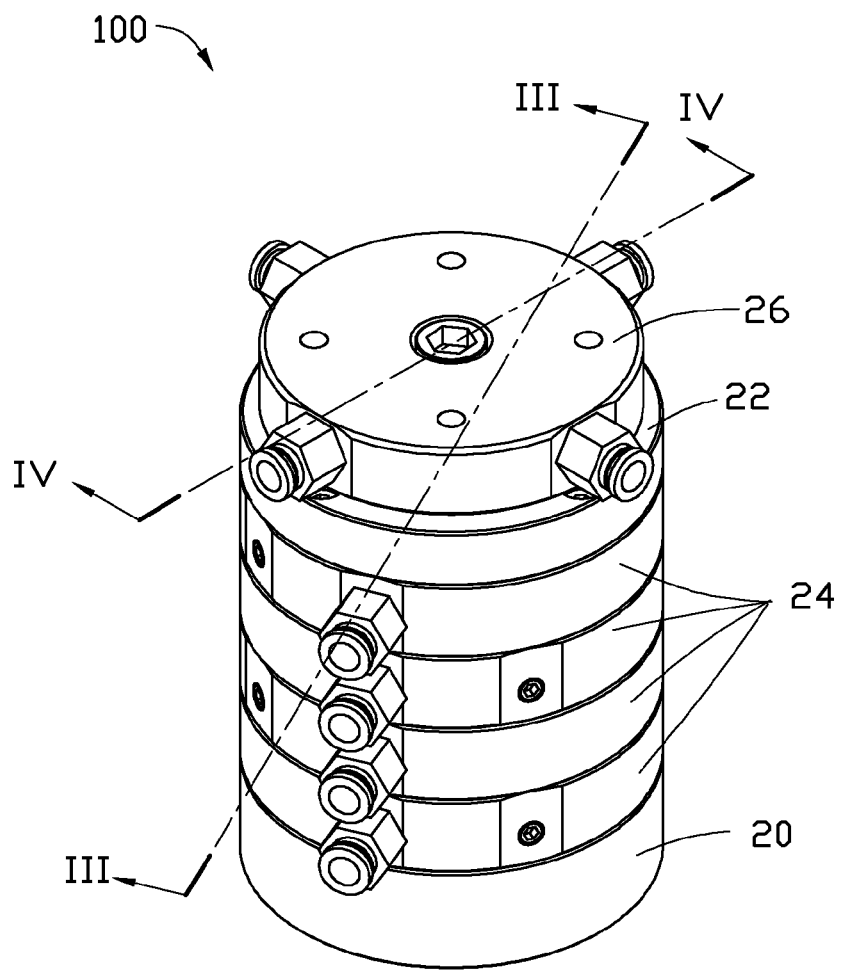
FIG. 1 is an isometric view of a first embodiment of a rotary joint.
Figure 2:
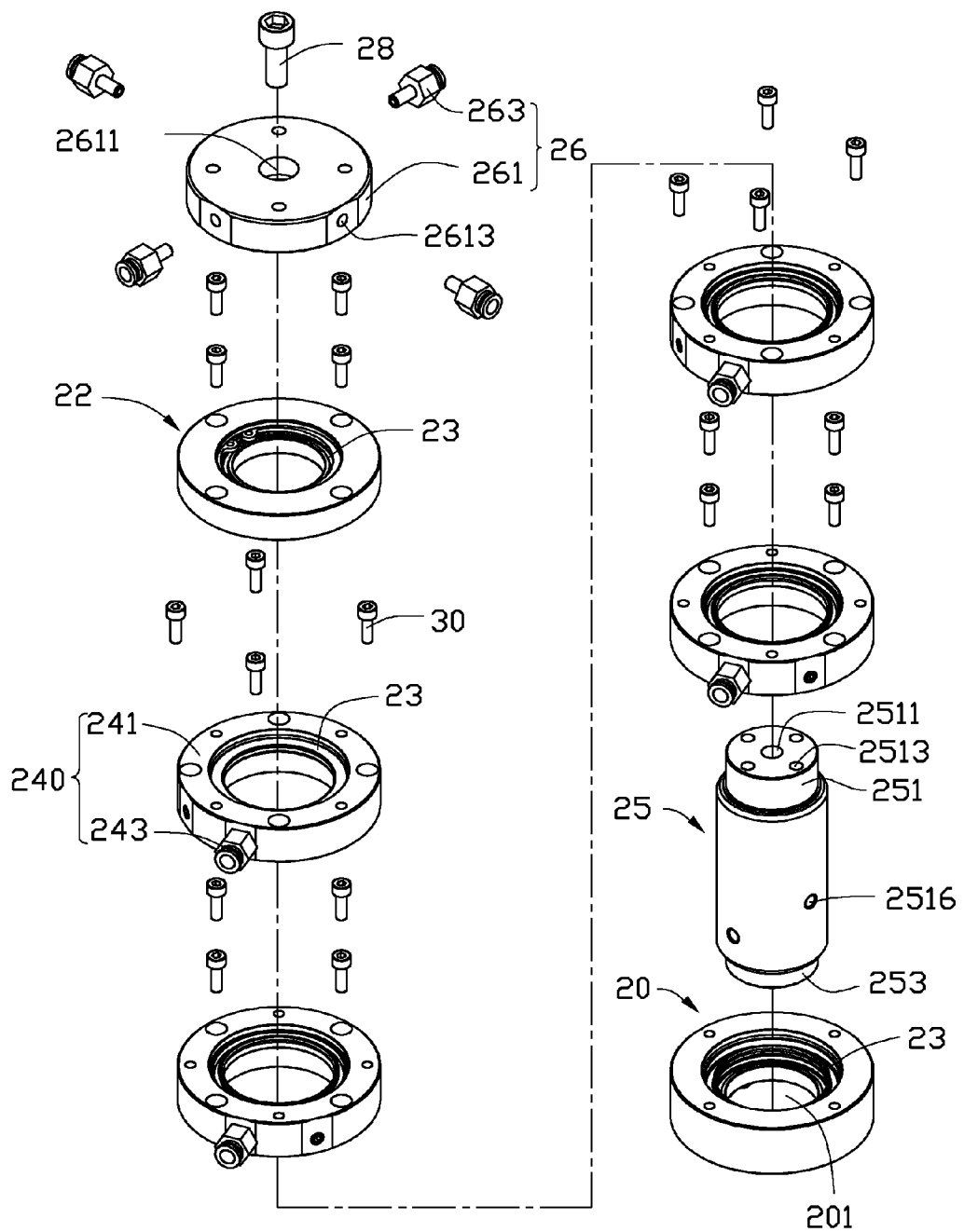
FIG. 2 is an exploded, isometric view of the rotary joint of FIG. 1.
Figure 3:
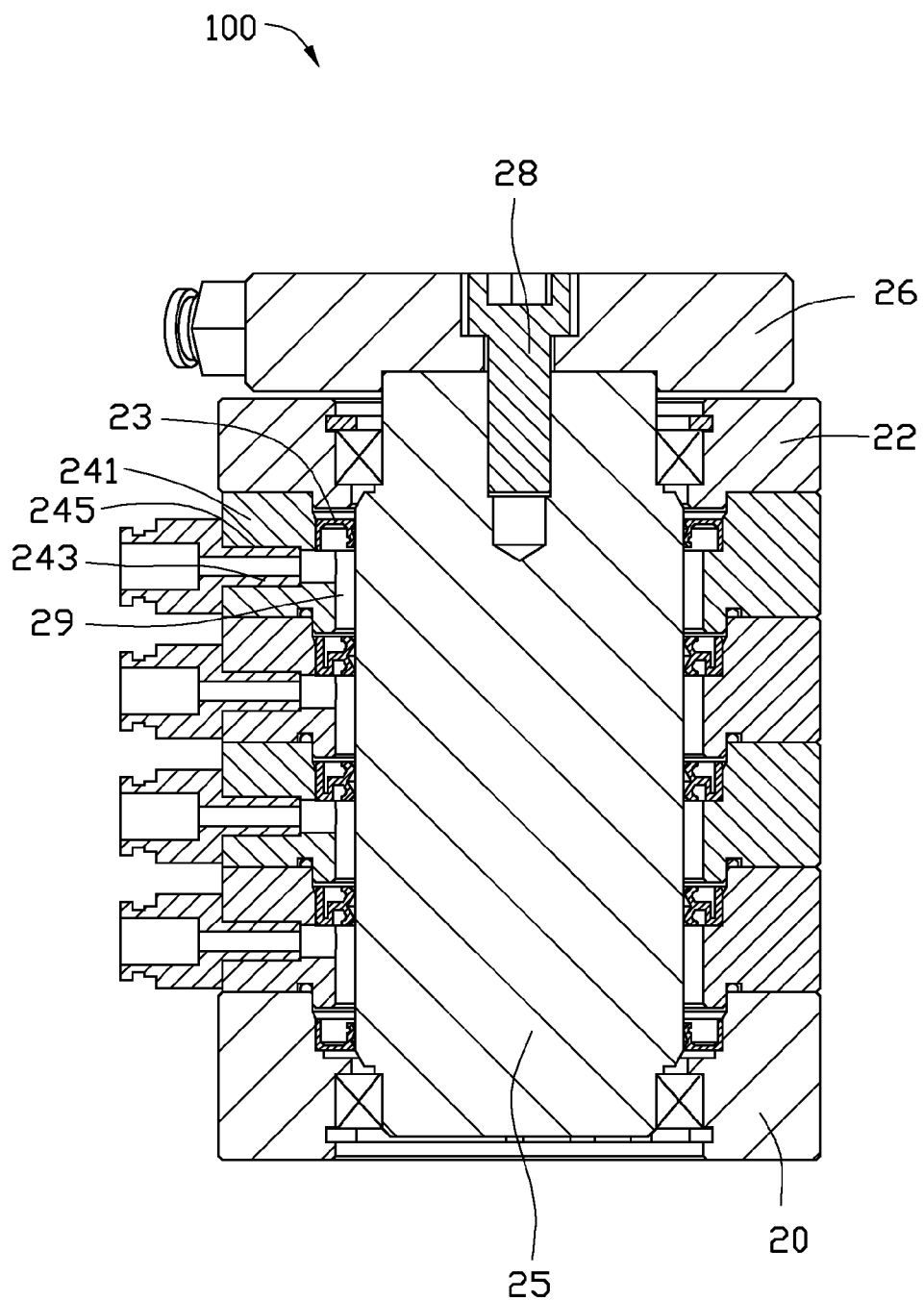
FIG. 3 is a cross section of the rotary joint of FIG. 1, taken along line III-III.

Referring to FIGS. 1 through 3, an embodiment of the rotary joint 100 includes a circular bottom cover 20, an upper cover 22 corresponding to the bottom cover 20, a plurality of sealing members 23, an input assembly 24, a shaft 25, an output member 26, and a locking member 28. In the illustrated embodiment, the locking member 28 is a screw.

The bottom cover 20 defines a shaft hole 201 in the center thereof for mounting the shaft 25. A sealing member 23 is mounted at an inner surface of the bottom cover 20. The upper cover 22 defines a through hole 221 in the center thereof. In the illustrated embodiment, the input assembly 24 includes four input members 240. Each input member 240 includes a substantially circular main body 241 and an input plug 243. One sealing member 23 is mounted on at an inner surface of the main body 241. The main body 241 defines a receiving hole 245 on a side surface of the main body 241. An end of the input plug 243 is received in the receiving hole 245, and another end of the input plug 243 is exposed out of the main body 241.

Figure 4:
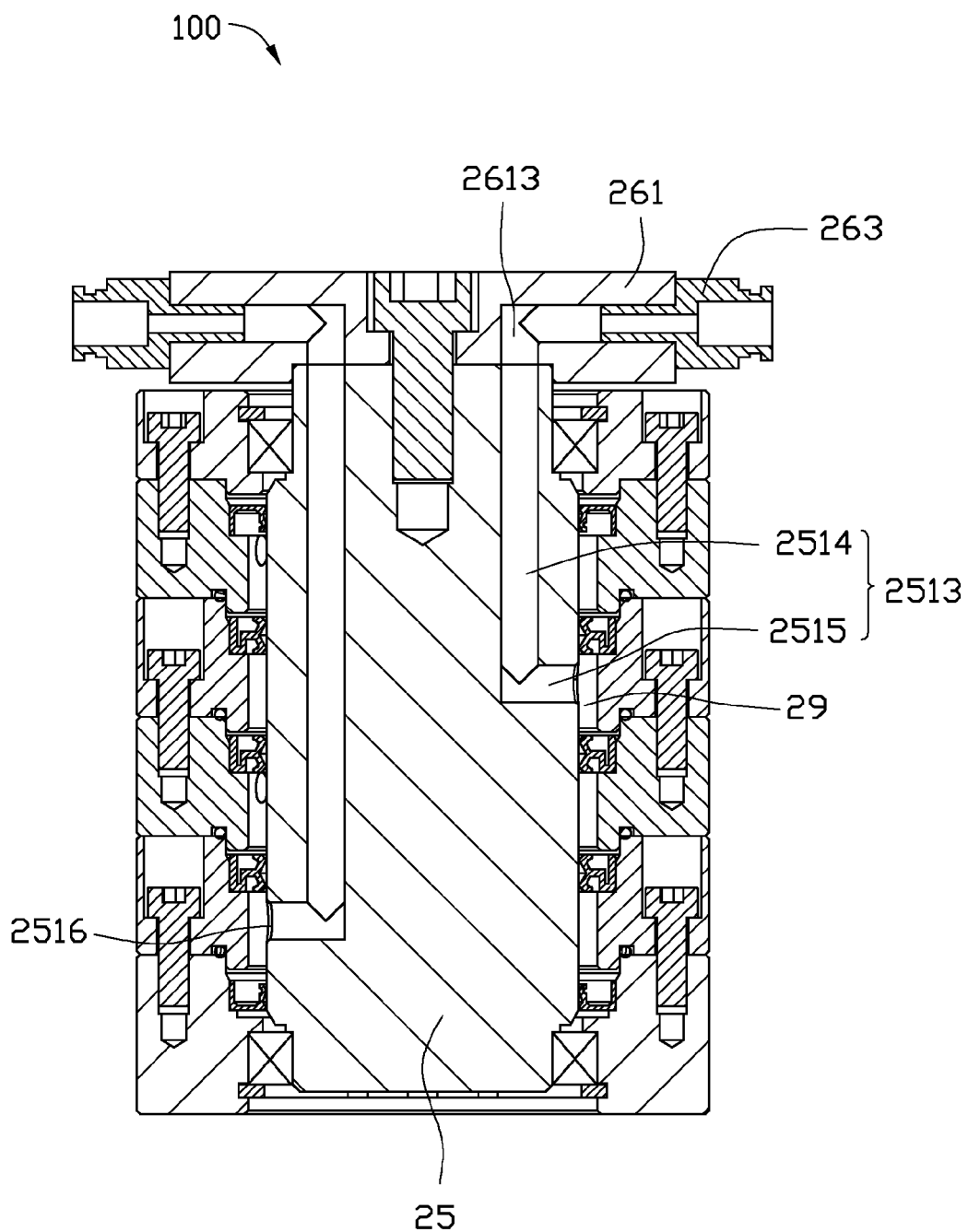
FIG. 4 is a cross section of the rotary joint of FIG. 1, taken along line IV-IV.

Also referring to FIG. 4, the shaft 25 forms a first fixing portion 251 at an end thereof connecting to the upper cover 22 and a second fixing portion 253 at another end connecting to the bottom cover 20. The shaft 25 defines a fixing hole 2511 at an end surface of the first fixing portion 251 and four transmission holes 2513 surrounding the fixing hole 2511. In the illustrated embodiment, the fixing hole 2511 is a threaded hole, corresponding to the locking member 28 for fixing the output member 26 on the shaft 25. The transmission hole 2513 extends in the shaft 25, and at a side surface of the shaft 25. Each transmission hole 2513 includes a transmitting portion 2514 extending axially, a guiding portion 2515 extending radially communicating with the transmitting portion 2514 and an opening 2516 at the side surface of the shaft 25. Each opening 2516 has an axial position at the shaft, thus the four openings 2516 correspond respectively to the four input members 240.

The output member 26 includes a round base 261 and four conduits 263. The base 261 defines a circular hole 2611 through which the locking member 28 passes. The base 261 defines an output hole 2613 at a circumference. The output hole 2613 extends through the base 261 to a surface thereof, connecting to the transmitting portion 2514 of the transmission hole 2513. The four conduits are mounted in the output holes respectively, for transmitting liquid.

In assembly, the second fixing portion 253 of the shaft 25 is received in the shaft hole 201 of the bottom cover 20. The sealing member 23 contacts an outer surface of the second fixing portion 253, for hermetically positioning the shaft 25 in the shaft hole 201. The four input members 240 are sleeved on the shaft 25 in order. The upper cover 22 is mounted on the first fixing portion 251 of the shaft 25, and the sealing member 23 in the upper cover 22 contacts an outer surface of the first fixing portion 251. The upper cover 22, the input members 240, and the bottom cover 20 are fixed together by fasteners 30 and rotatably sleeved on the shaft 25. An inner diameter of the input member 240 is greater than an outer diameter of the shaft 25, thus the input member 240, the shaft 25, and the two adjacent sealing members 23 cooperatively define a circular channel 29. The circular channel 29 communicates with the opening 2516 of the transmission hole 2513 accordingly. The locking member 28 passes through the through hole 2611 and threads in the fixing hole 2511 of the shaft, to fix the output member 26 on the shaft 25. The fluid enters the input plug 243 of the input assembly 24, and can be exported from the conduit 263 of the output member 26, via the circular channel 29 and the transmission hole 2513 in that order, even when the shaft 25 is rotating relative to the input assembly 24.

Figure 5:
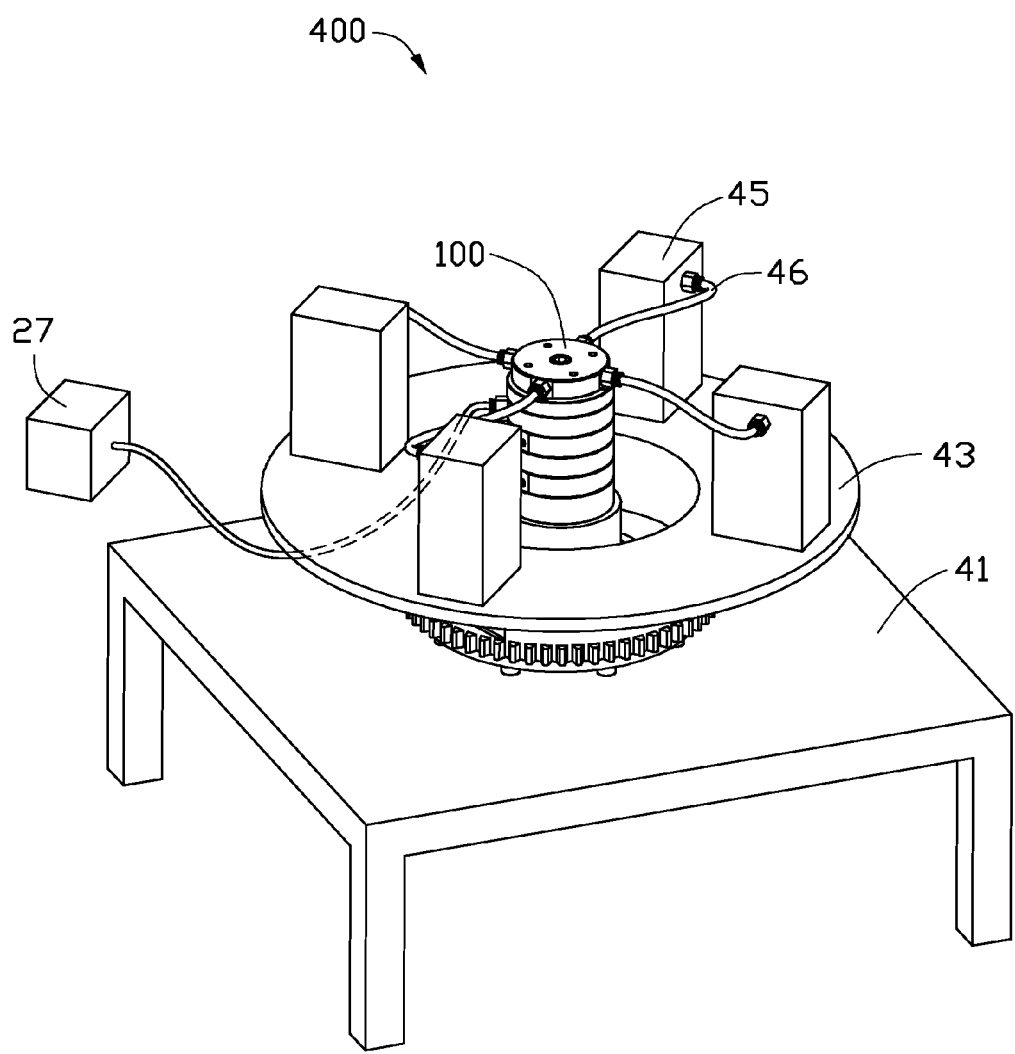
FIG. 5 is an isometric view of a worktable using the rotary joint of FIG. 1.

Referring to FIG. 5, a worktable 400 using the rotary joint 100 is shown. The worktable 400 further includes a support member 41 fixed to the bottom cover 20 for supporting the bottom cover 20, a rotary member 43 rotatably positioned on the support member 41, and four workstations 45 for manufacturing work pieces. The input members 240 are connected to a liquid source 27, and the four output members 26 are connected to the four workstations 45 respectively by transmitting conduits 263, such that the liquid source 27 can provide liquid such as gas or oil for the workstations 45. When the rotary member 43 rotates, the workstations 45, the output member 26 of the rotary joint 100, and the shaft 25 also rotate, following the rotary member 43. Because the circular channel 29 communicates with the transmission hole 2513 when the shaft 25 rotates, the liquid can be provided continuously from the liquid source 27.

It should be noted that the number of the workstations 45 may be one, two, three, five, or more as desired, and the number of the output numbers 26 adjusted accordingly.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A rotary joint comprising:
a bottom cover;
a shaft rotatably mounted on the bottom cover;

at least one input member rotatably sleeved on the shaft, the at least one input member comprising an input hole configured to be connected to a liquid source;

a plurality of sealing members positioned between the shaft and the at least one input member, the shaft, the at least one input member and the sealing members cooperatively defining a circular channel communicating with the input hole; and an output member fixed on the shaft, the output member defining at least one output hole corresponding to the at least one input member, wherein the shaft defines at least one transmission hole intercommunicating the at least one output hole and the circular channel.

2. The rotary joint of claim 1, further comprising an upper cover and a bottom cover, wherein the at least one input member is between the upper cover and the bottom cover and fixed with the upper cover and the bottom cover together.

3. The rotary joint of claim 1, wherein the number of the at least one input member is at least two, the at least two input members are arranged on the shaft side by side along an axial direction of the shaft, each input member and the shaft cooperatively define a circular channel therebetween, the shaft defines at least two transmission holes corresponding to the at least two input members, and each transmission hole intercommunicates the circular channel and the at least one output hole accordingly.

4. The rotary joint of claim 3, wherein each transmission hole has an opening at a side surface of the shaft communicating with the circular channel.

5. The rotary joint of claim 4, wherein each transmission hole comprises a transmitting portion extending axially and a guiding portion extending radially in the shaft.

6. The rotary joint of claim 4, wherein each opening has an individual axial position on the side surface of the shaft corresponding to one input member.

7. A worktable comprising:
a support member;
a rotary member rotatably positioned on the support member;
at least one workstation positioned on the rotary member, the at least one workstation being configured for manufacturing workpiece; and
a rotary joint comprising:
a bottom cover fixed to the support member;
a shaft rotatably mounted on the bottom cover;
at least one input member rotatably sleeved on the shaft, the at least one input member comprising an input hole configured to be connected to a liquid source;
a plurality of sealing members positioned between the shaft and the input member, the shaft, the input member, and the sealing members cooperatively defining a circular channel communicating with the input hole; and
an output member fixed on the shaft, the output member defining at least one output hole corresponding to the at least one input member, wherein the shaft defines at least one transmission hole intercommunicating the at least one output hole and the circular channel, the at least one output hole is connected to the at least one workstation.

8. The worktable of claim 7, wherein the rotary joint further comprises an upper cover opposite to the bottom cover, the at least one input member is between the upper cover and the bottom cover and fixed with the upper cover and the bottom cover together.

9. The worktable of claim 7, wherein the number of the at least one input member is at least two, the number of the at least one workstation is at least two, the at least two input members are arranged on the shaft side by side along an axial direction of the shaft, each input member and the shaft defines a circular channel therebetween, the shaft defines at least two transmission holes corresponding to the at least two input members, and each transmission hole intercommunicates the circular channel and the at least one output hole accordingly.

10. The worktable of claim 9, wherein each transmission hole has an opening at a side surface of the shaft communicating with the circular channel.

11. The worktable of claim 10, wherein each transmission hole comprises a transmitting portion extending axially and a guiding portion extending radially in the shaft.

12. The worktable of claim 10, wherein each opening has an individual axial position on the side surface of the shaft corresponding to on input member.

* * * * *